United States Patent
Breau et al.

(10) Patent No.: US 8,391,208 B1
(45) Date of Patent: Mar. 5, 2013

(54) METHODS OF SETTING MOBILE INTERNET PROTOCOL TIMER VALUE

(75) Inventors: Jeremy R. Breau, Leawood, KS (US); Terry D. Nebergall, Gardner, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 820 days.

(21) Appl. No.: 12/401,609

(22) Filed: Mar. 10, 2009

(51) Int. Cl.
*H04W 4/00* (2009.01)

(52) U.S. Cl. ..... 370/328; 370/331; 370/338; 455/435.1; 455/453

(58) Field of Classification Search .............. 370/328, 370/230, 349; 455/435.1
See application file for complete search history.

(56) References Cited

U.S. PATENT DOCUMENTS

| | | | |
|---|---|---|---|
| 7,003,294 B2 | 2/2006 | Singhai et al. | |
| 7,746,774 B2 * | 6/2010 | Xue et al. | 370/230 |
| 2003/0153325 A1 * | 8/2003 | Veerepalli et al. | 455/453 |
| 2004/0052238 A1 * | 3/2004 | Borella et al. | 370/349 |
| 2004/0260831 A1 | 12/2004 | Dyck et al. | |
| 2006/0104247 A1 * | 5/2006 | Dommety et al. | 370/338 |
| 2006/0153063 A1 * | 7/2006 | Islam et al. | 370/216 |
| 2007/0274262 A1 * | 11/2007 | Hung et al. | 370/331 |
| 2008/0089308 A1 | 4/2008 | Jentz et al. | |
| 2008/0107070 A1 * | 5/2008 | Sastry | 370/329 |
| 2008/0108348 A1 * | 5/2008 | Kottingal et al. | 455/435.1 |
| 2010/0161797 A1 * | 6/2010 | Nandagopal et al. | 709/225 |

* cited by examiner

*Primary Examiner* — Pao Sinkantarakorn
*Assistant Examiner* — Richard K Chang

(57) ABSTRACT

A method for automatically managing mobile Internet Protocol re-registration is provided. The method comprises a home agent receiving a mobile Internet Protocol registration message and in response to the mobile Internet Protocol registration message, the home agent determines a registration lifetime based on dynamic mobile Internet Protocol network operating conditions. The method also comprises the home agent transmitting a registration response message comprising the registration lifetime.

14 Claims, 7 Drawing Sheets

METHODS OF SETTING MOBILE INTERNET PROTOCOL TIMER VALUE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Recent advances in wireless communication technology and the dynamic growth of the Internet have paved the way for wireless networking and Internet Protocol (IP) mobility. When a mobile electronic device connects to a website, a mobile Internet Protocol (MIP) may be used to allow the mobile device to stay connected to the Internet regardless of the geographic location, without changing the IP address. The home agent is the mobility gateway at the wireless service provider that serves as the point of communication when the mobile device travels into a different coverage area, for example a coverage area of a different base transceiver station or femtocell. The MIP establishes a tunnel connection between the home agent and the mobile agent regardless of where the mobile device user travels and allows the mobile device to stay seamlessly connected to the Internet.

SUMMARY

In an embodiment, a method for automatically managing mobile Internet Protocol re-registration is provided. The method comprises a home agent receiving a mobile Internet Protocol registration message and in response to the mobile Internet Protocol registration message, determining a registration lifetime based on dynamic mobile Internet Protocol network operating conditions. The method also comprises the home agent transmitting a registration response message comprising the registration lifetime.

In another embodiment, a method of automatically managing mobile Internet Protocol re-registration is provided. The method comprises a home agent receiving a mobile Internet Protocol registration message and in response to the mobile Internet Protocol registration message, determining a registration lifetime based on at least a current load of mobile Internet Protocol registration messages. The method also comprises the home agent transmitting a registration response message comprising the registration lifetime.

In another embodiment, a method for automatically managing mobile Internet Protocol re-registration is provided. The method comprises a home agent receiving a mobile Internet Protocol registration message and in response to the mobile Internet Protocol registration message, determining a registration lifetime based at least on currently available system operating resources. The method also comprises the home agent transmitting a registration response message comprising the registration lifetime.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
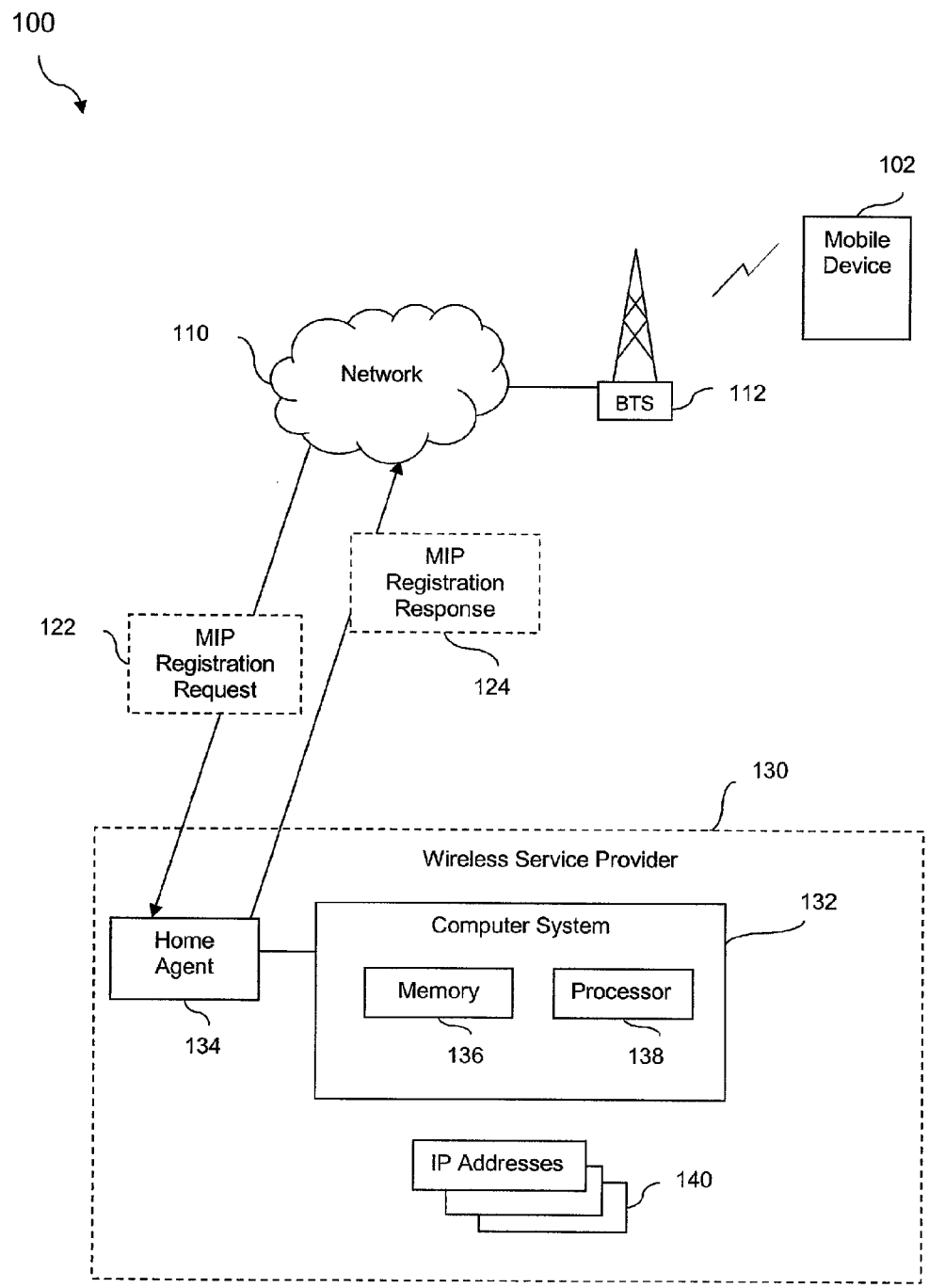
FIG. 1 illustrates a system for setting a mobile Internet Protocol registration timer according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A method for dynamically setting mobile Internet Protocol registration times is disclosed. In an embodiment, a wireless service provider may be given an allotment of IP addresses to assign to mobile device customers each time a request is made for Internet access. When a mobile electronic device establishes a data session, a message may be sent to a home agent at the wireless service provider to request registration to a mobile Internet Protocol (MIP) address to be able to maintain an open data session. Customarily, home agents have used a statically configured registration lifetime parameter to allocate the registration lifetime to the mobile electronic device requesting MIP registration. The home agent (i.e., mobility gateway) disclosed herein, may assign varying duration registration lifetimes to the registering mobile electronic device based on dynamically determining the registration lifetime based on registration request loads, based on the availability of Internet Protocol addresses, and based on the load on other system resources. The home agent may then transmit the registration lifetime information back to the mobile device. Also, before the session ends, the mobile device may automatically re-register to maintain the open data session, for example if the mobile device is still using the data session. In an embodiment, by analyzing current operating conditions to dynamically determine the registration lifetime, the home agent can better manage the load on the system's resources and the availability of MIP addresses.

When a mobile electronic device requests registration to a MIP address, the traditional home agent may respond to the registration request with a statically defined registration lifetime, for example a registration lifetime of about 3600 seconds statically configured into the home agent, for example by an administrator. Under this scenario, when a large number of mobile electronic devices request registration for MIP addresses at substantially the same time, for example when a mobile access gateway (MAG) returns to service after an outage, many of the mobile electronic devices may re-register immediately before the end of the registration lifetime and the peak load will be repeated, a mirror image of the original peak load. This peak load may repeat periodically every about 3600 seconds for some time. The peak loads on the home agent may result in service delays or other conditions that depress customer satisfaction and/or operating efficiency. In an embodiment, to manage the load on the system and reduce the likelihood of service delays, the home agent dynamically determines registration lifetimes based on registration request loads and/or based on availability of system resources such as Internet Protocol addresses, memory, and other resources. The home agent may smooth and spread peaks of registration requests by varying the duration of the registration lifetime returned in the registration reply message during peak registration periods. The home agent may analyze current registration request loads and system resource availability periodically, for example every 10 mS, every 100 mS, or some other period, to determine the registration lifetimes rather than performing this analysis during every registration request. Alternatively, the home agent may perform this analysis every 10 registration requests, every 100 registration requests, or some other number of registration requests.

In an embodiment, the home agent may dynamically determine the registration lifetime to assign to each mobile electronic device when it sends a registration request for a MIP address. For example, in an embodiment, when an unusually large number of mobile electronic devices request registration at the same time, instead of assigning a nominal registration lifetime of about 3600 seconds in every registration response, the home agent may assign a registration lifetime selected round-robin from a limited number of varying lifetimes, for example a first registration lifetime of 3500 seconds, a second registration lifetime of 3520 seconds, a third registration lifetime of 3540 seconds, a fourth registration lifetime of 3560 seconds, a fifth registration lifetime of 3580 seconds, a sixth registration lifetime of 3600 seconds, a seventh registration lifetime of 3620 seconds, an eighth registration lifetime of 3640 seconds, a ninth registration lifetime of 3660 seconds, a tenth registration lifetime of 3680 seconds, and an eleventh registration lifetime of 3700 seconds. In an embodiment, the home agent may change the different values of registration lifetimes to vary more or less from a nominal registration lifetime, for example 3600 seconds, as the current registration request loads is greater or less. While eleven different registration lifetimes were identified in the exemplary embodiment described above, in different embodiments, more or fewer different registration lifetimes may be used. A greater number of registration lifetimes may involve a greater processing load but may provide greater smoothing and spreading of peak registration loads; a smaller number of registration lifetimes may involve less processing load but may provide less smoothing and spreading of peak registration loads. In an embodiment, the home agent may simply assign a nominal registration lifetime, for example 3600 seconds, when the current registration request load is below a threshold, for example below 10 registration requests per 10 mS, per 100 mS, per second, or some other predefined load threshold. By allocating different registration lifetimes, the home agent may effectively manage the future load it sees when these same mobile electronic devices re-register. The varying registration lifetimes may smooth and spread peak registration loads.

In an embodiment, the home agent may contain logic that allows it to plan registration lifetimes by looking at current registration loads, historical registration loads, the percentage of available MIP addresses being used, the number of MIP addresses being requested, and the capacity of the system. The home agent can then dynamically insert the variable registration lifetime into each reply message sent to each mobile device.

Turning now to FIG. 1, a system 100 for automatically managing MIP registration is described. The system 100 comprises a mobile device 102, a base transceiver station 112, a network 110, a MIP registration request 122, a MIP registration response 124, and a wireless service provider 130. In an embodiment, the wireless service provider 130 may comprise a home agent 134, a computer system 132, a memory 136, a processor 138, and multiple IP addresses 140. The mobile device 102 may be one of a mobile phone, a personal digital assistant (PDA), a media player, a laptop computer, a tablet computer, or other mobile electronic device having wireless communication capability. A mobile phone is discussed in detail hereinafter. The home agent 134 may be referred to as a mobility gateway that communicates with the mobile device 102 through the base transceiver station 112 and the network 110. The MIP registration request 122 and the MIP registration response 124 represent a plurality of MIP messages used to complete the registration of a mobile device to an Internet Protocol address. The exchange of messages may also be referred to as a handshake. In an embodiment the IP addresses 140 may be Internet Protocol version 4 (IPv4) addresses that provide connectivity to a data session for the mobile device 102. In another embodiment however, the IP addresses may be Internet Protocol version 6 (IPv6) addresses or another version of IP addresses 140. The computer system 132 comprises the memory 136 and the processor 138. Computers are discussed in detail hereinafter.

In an embodiment, to open a data session on the Internet, the mobile device 102 may send the MIP registration request 122, to the home agent 134 at the wireless service provider 130. When the home agent 134 receives the request, it may determine the lifetime of the registration by analyzing the current and/or historic MIP registration request 122 load, the availability of IP addresses 140 that are assigned to the wireless service provider 130, and/or the operating resources of the computer system 132. The home agent 134 may adapt the registration lifetime to reduce the burden on the operating resources of the computer system 132 or to increase the availability of IP addresses 140 for allocating to the mobile device 102. When a shortage of IP addresses 140 for allocating to the mobile device 102 is the problem, reducing the time duration of registration lifetimes may result in increasing the pool of unallocated IP addresses 140, by releasing unused mobile IP addresses 140 earlier. A strategy of varying the registration lifetime—increasing the duration of some registration lifetimes and reducing the duration of other registration lifetimes—may reduce the burden on the operating resources of the computer system 132 under some operating conditions, for example when there has been a sharp peak of registration events. The relative severity of these different problems may be used to select which of these two different registration lifetime adaptation strategies to pursue at a specific time.

In an embodiment, the home agent 134 may analyze system conditions and adapt the registration lifetime for every registration request. Alternatively, in other embodiments, the home agent 134 may analyze system conditions and adopt the registration lifetime after every 10 registration requests, after every 100 registration requests, after every 1000 registration requests, or after some other number of registration requests, thereby reducing the processing load on the home agent 134. Alternatively, in other embodiments, the home agent 134 may analyze system conditions and adopt the registration lifetime periodically, for example every 10 mS, every 100 mS, every second, or on some other period. The home agent 134 may then send the MIP registration response 124 back to the mobile device 102. The MIP registration response 124 may include the registration lifetime assigned to the mobile device 102. Before the registration lifetime of the data session ends, the mobile device 102 may automatically re-register to maintain access to the Internet.

When the home agent 134 identifies a spike in MIP registration requests 122, the home agent 134 may vary the registration lifetimes allocated in the MIP registration responses 124 so the electronic mobile devices 102 do attempt to re-register at substantially the same time, thereby repeating the earlier spike. For example, if the normal lifetime for a registration is 3600 seconds, the home agent 134 could assign variable registration lifetimes (e.g., 3500 seconds, 3520 seconds, . . . 3680 seconds, and 3700 seconds) in a round-robin fashion in each subsequent MIP registration response 124 so that the subsequent requests for re-registration will be staggered over a period of time, thus spreading out and flattening the spike in re-registration requests. Alternatively, if the registration request peak were lower, the home agent 134 could assign registration lifetimes having less variation (e.g., 3550 seconds, 3560 seconds, . . . 3640 seconds, and 3650 seconds). Alternatively, if the registration request peak were higher, the home agent 134 could assign registration lifetimes having greater variation (e.g., 3400 seconds, 3440 seconds . . . , 3760 seconds, and 3800 seconds). In an embodiment, when the load of MIP registration requests 122 is below a predefined threshold, the home agent 134 may simply assign the same nominal registration lifetime in each MIP registration response 124. Alternatively, in another embodiment, the home agent 134 may always vary registration lifetimes returned in the MIP registration response 124.

In one embodiment, when the current load of MIP registration requests 122 goes above a predefined threshold, for example above a predefined threshold of MIP registration requests 122 per unit of time, the home agent 134 may vary the average registration lifetimes from the nominal registration lifetime based on how high the current load is above the predefined threshold and the rate of change of the numbers of registration messages. For example, when the rate of change of MIP registration requests 122 is increasing, the duration of registration lifetimes may decrease. Likewise when the rate of change of MIP registration requests 122 is decreasing, the duration of registration lifetimes may increase. In another embodiment when the current load of MIP registration requests 122 goes above a predefined threshold, the home agent 134 may use a round-robin selection process to select a registration time from a predefined number M of calculated registration times that are determined based on how much the current load is above the predefined threshold. In another embodiment, the home agent 134 may vary the registration lifetime based on a history of MIP registration requests 122 over a predefined length of time.

If the pool of available IP addresses 140 of the computer system 132 drops below a predefined threshold, users may encounter delays when trying to access the Internet. To alleviate the problem, the home agent 134 can reduce the length of the predefined nominal registration lifetime to free up the resources of the computer system 132. In an embodiment, if the pool of available IP addresses 140 drops below a predefined threshold, the registration lifetimes may be reduced by an amount based on how much the pool of available IP addresses is below the threshold. In another embodiment, if the capacity of the memory 136 or the processor 138 drops below a predefined threshold, the registration lifetimes may be reduced by an amount based on how much the capacity is below the threshold. In another embodiment, to free up system resources, rather than to calculate a registration lifetime for every MIP registration request 122 that comes in, the home agent 134 may only calculate registration lifetimes on a periodic basis (e.g., every 10 mS). Alternatively, the home agent 134 may wait to calculate registration lifetimes after receiving a pre-determined number of MIP registration requests 122 (e.g., after every 50 requests).

Figure 2:
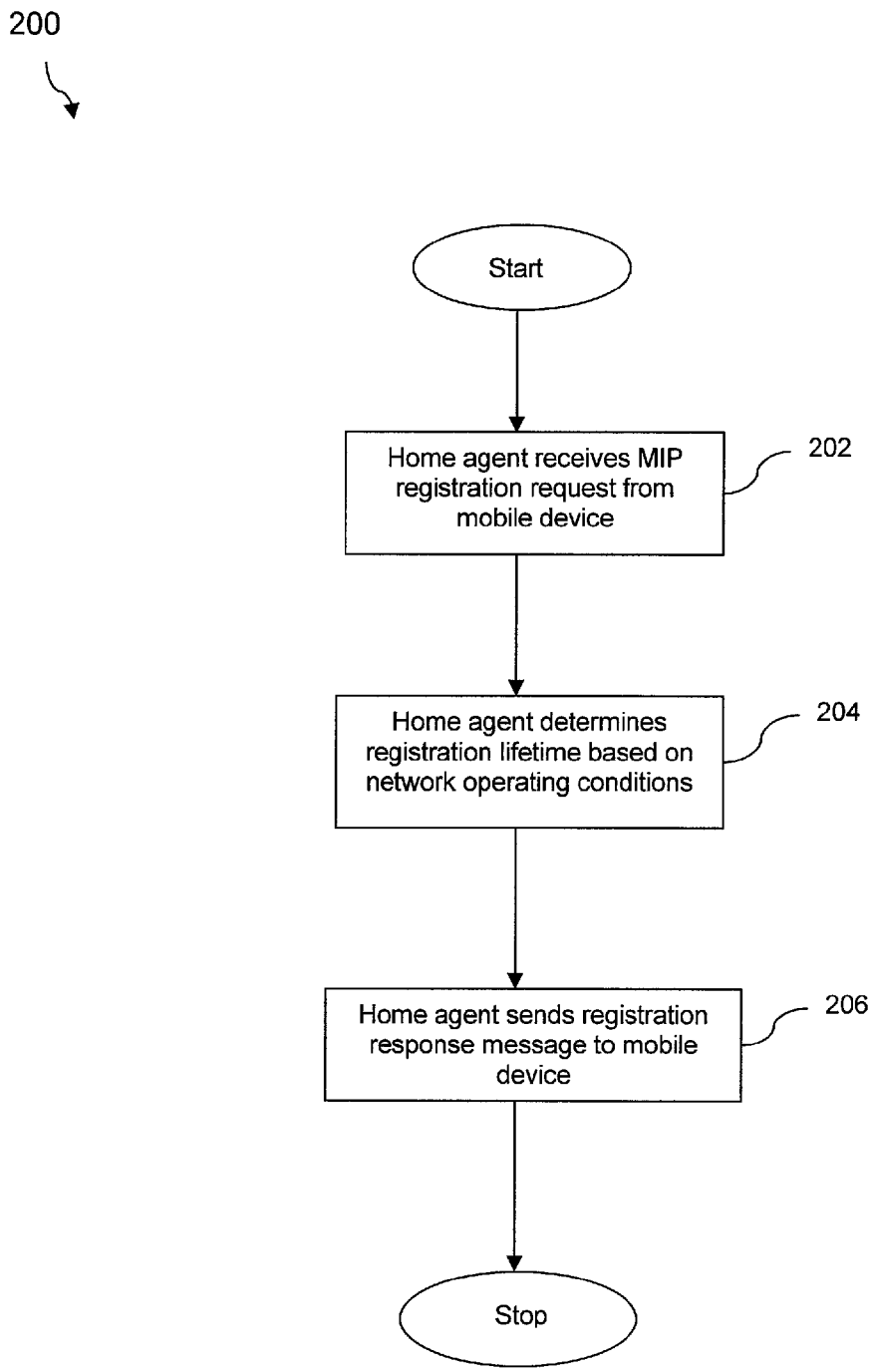
FIG. 2 is a flowchart of a method to manage mobile Internet Protocol registration according to an embodiment of the disclosure.

Turning now to FIG. 2, a method 200 for automatically managing MIP registration is described. The method 200 begins at block 202 where the home agent 134 receives the MIP registration request 122 from the mobile device 102 to obtain access to an Internet data session for a period of time. In block 204, the home agent 134 may determine the length of a registration lifetime to assign to the mobile device 102 by analyzing the dynamic MIP network operating conditions. In an embodiment, network operating conditions could be the current load of MIP registration requests 122 or the current available resources of the computer system 132 at the wireless service provider 130 (e.g., the IP addresses 140, the memory 136, the processor 138).

Once the lifetime of the registration is determined, the method 200 moves to block 206 where the home agent 134 sends the MIP registration response 124 to the mobile device 102. In an embodiment, the MIP registration response 124 would include the duration of the registration lifetime which may be between approximately 10 and 120 minutes. The home agent 134 would then keep the data session open for the mobile device 102 for the length of the registration lifetime.

Figure 3:
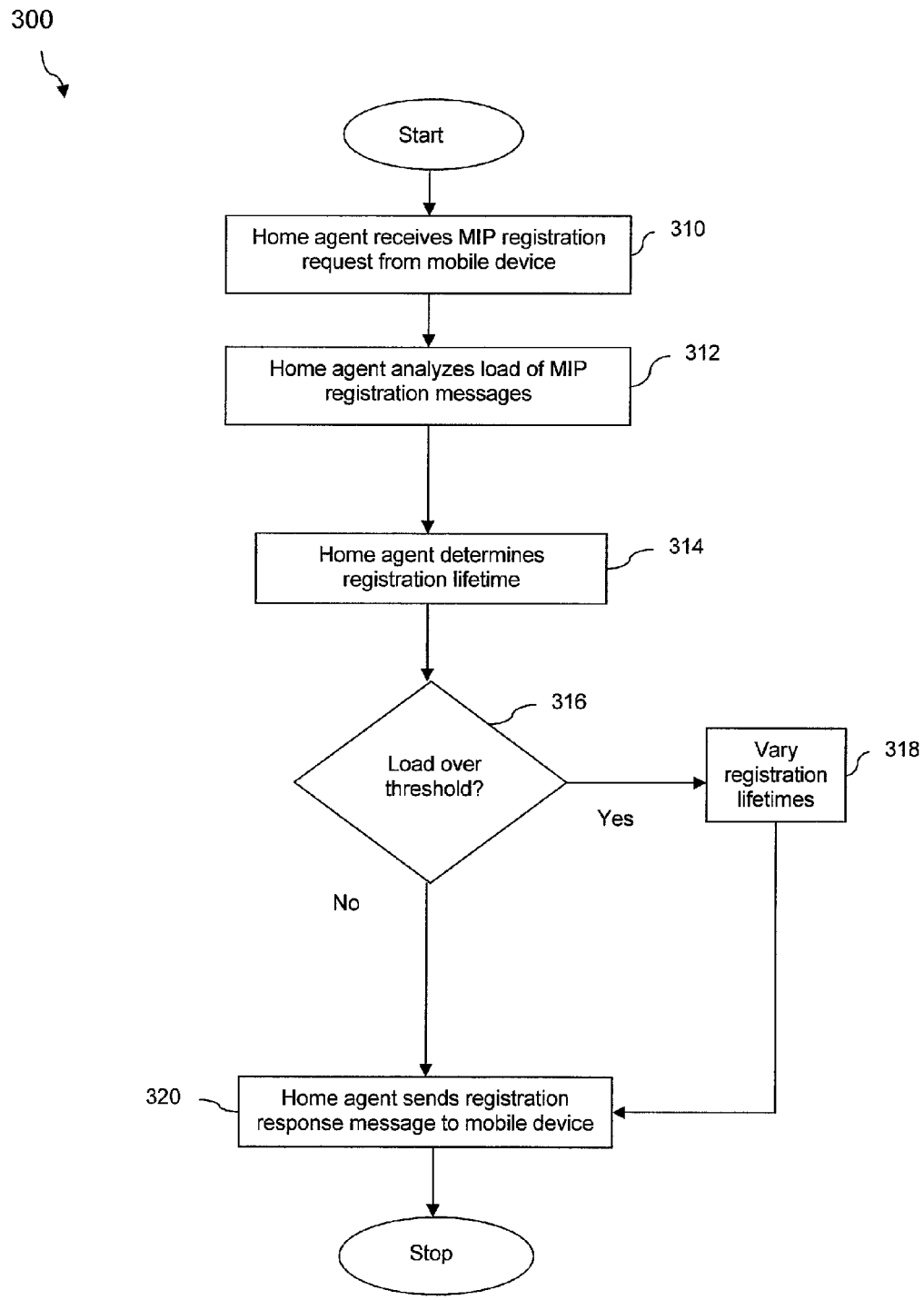
FIG. 3 is a flowchart of another method to manage mobile Internet Protocol registration according to an embodiment of the disclosure.

Turning now to FIG. 3, a method 300 for automatically managing MIP registration is described. The method 300 begins at block 310 where the home agent 134 receives the MIP registration request 122 from the mobile device 102 to obtain access to an Internet data session for a period of time. In block 312 the home agent 134 may analyze the current load of MIP registration requests 122 to determine the future load so that a possible spike in re-registrations can be reduced. In an embodiment, the current load of MIP registration requests 122 may be determined by calculating a sliding window average number of requests, for example by calculating the average number of MIP registration requests 122 over the five most recent 10 mS time intervals, over the ten most recent 10 mS time intervals, or over some other number of time intervals. In another embodiment, the home agent 134 may further determine a rate of change of the number of MIP registration requests 122 in a period of time and use the rate of change to dynamically adopt and determine the registration lifetimes. For example, if the rate of change in the number of requests is positive, the load is increasing, and the registration lifetime may be reduced from the nominal registration lifetime. When the rate of change in the number of requests is negative, the load is decreasing, and the registration lifetime may be extended from the nominal registration lifetime. The larger the absolute value of the rate of change, the more steeply peaked the anticipated load of MIP registration requests 122.

Once the current load of MIP registration requests 122 is calculated, the method moves to block 314 where the home agent 134 may determine the duration of the registration lifetime to assign to the MIP registration request 122 based on the current load and the rate of change of MIP registration requests 122. If an unusually large number of MIP registration requests 122 were received by the home agent 134 at the same time and if the lifetime duration of all the registrations are the same length, it could be assumed that an undesirable spike in usage could occur if all the mobile devices 102 want to re-register to maintain access to their assigned MIP address. To reduce a spike in re-registrations, the home agent 134 could shorten or lengthen the registration lifetimes so that they do not all come up for re-registration at the same time.

In an embodiment, a threshold may be defined for an acceptable number of MIP registration requests 122 that can be managed and still achieve optimal customer service. If the current load stays below the threshold, the duration of each registration lifetime will be assigned at a predefined nominal length of time (e.g., 3600 seconds). If the current load of MIP registration requests 122 goes above the predefined threshold, the home agent 134 may vary the average registration lifetimes from the predefined nominal registration lifetime (e.g., 3500 seconds, 3550 seconds, 3650 seconds 3700 seconds) based on how high the current load is above the predefined threshold. In addition, if the rate of change of MIP registration requests 122 is increasing, the home agent 134 may decrease the registration lifetimes from the predefined nominal registration lifetime (e.g., 3000 seconds, 3100 seconds, 3200 seconds). Likewise when the rate of change of MIP registration requests 122 is decreasing, the home agent 134 may increase the registration lifetimes from the predefined average registration lifetime (e.g., 3800 seconds, 3900 seconds). In an embodiment, the amount the registration lifetimes may vary from the nominal registration lifetime may depend on how steeply peaked the rate of change of MIP registration requests 122 and the amount the current load of MIP registration requests 122 are above the predefined threshold.

The duration of registration lifetimes may also vary depending on the history of past requests over a predefined period of time. If the home agent 134 is aware of how many MIP registration requests 122 have come in and at what times, it can predict the number of re-registration requests to determine the duration of subsequent re-registrations based on what IP addresses 140 will be available. If a large number of MIP registration requests 122 came in at the same time, the home agent 134 can vary the registration lifetimes to prevent a spike in requests if and when the mobile devices 102 want to re-register. In an embodiment, the MIP registration requests 122 can be grouped into a set number of revolving buckets of time so that when each group of re-registration requests comes back around, the duration of new re-registration lifetimes can be varied in length based on the current load (e.g., 58 minutes, 59 minutes, 60 minutes, 61 minutes). By using varied lengths of re-registration times, anticipated spikes in the number of MIP registration requests 122 can be spread out over time and the load on the system may be balanced over a period of time.

In another embodiment, when the current load of MIP registration requests 122 is above the predefined threshold, the home agent 134 may determine the registration lifetimes using a round-robin selection process from a predefined number M of calculated registration lifetimes, based on how much the current load is above the predefined threshold. For example, if the load of MIP registration requests 122 goes over the predefined threshold and the number M corresponds to 4 buckets of registration times, the home agent 134 may begin selecting new registration times (e.g., 3500, 3600, 3700, 3800) to assign to each MIP registration request 122, which would then result in spreading out the re-registration requests.

Once the lifetime of the registration is determined, the method 300 moves to block 316 where if the processing load experienced by home agent 134 is over the threshold, the processing moves to block 318 where the registration lifetime is varied. For example, in an embodiment, alternate registration requests may be provided a registration lifetime that exceeds the normal registration lifetime by a predefined amount and that are less than the normal registration lifetime by the predefined amount. Other methods of varying registration lifetime, as discussed further above, may also be employed. The process proceeds to block 320 where the home agent 134 sends the MIP registration response 124 to the mobile device 102. In an embodiment, the MIP registration response 124 may include the duration of the registration lifetime which may be between approximately 10 and 120 minutes. The home agent 134 may then keep the data session open for the mobile device 102 for the length of the registration lifetime.

Figure 4:
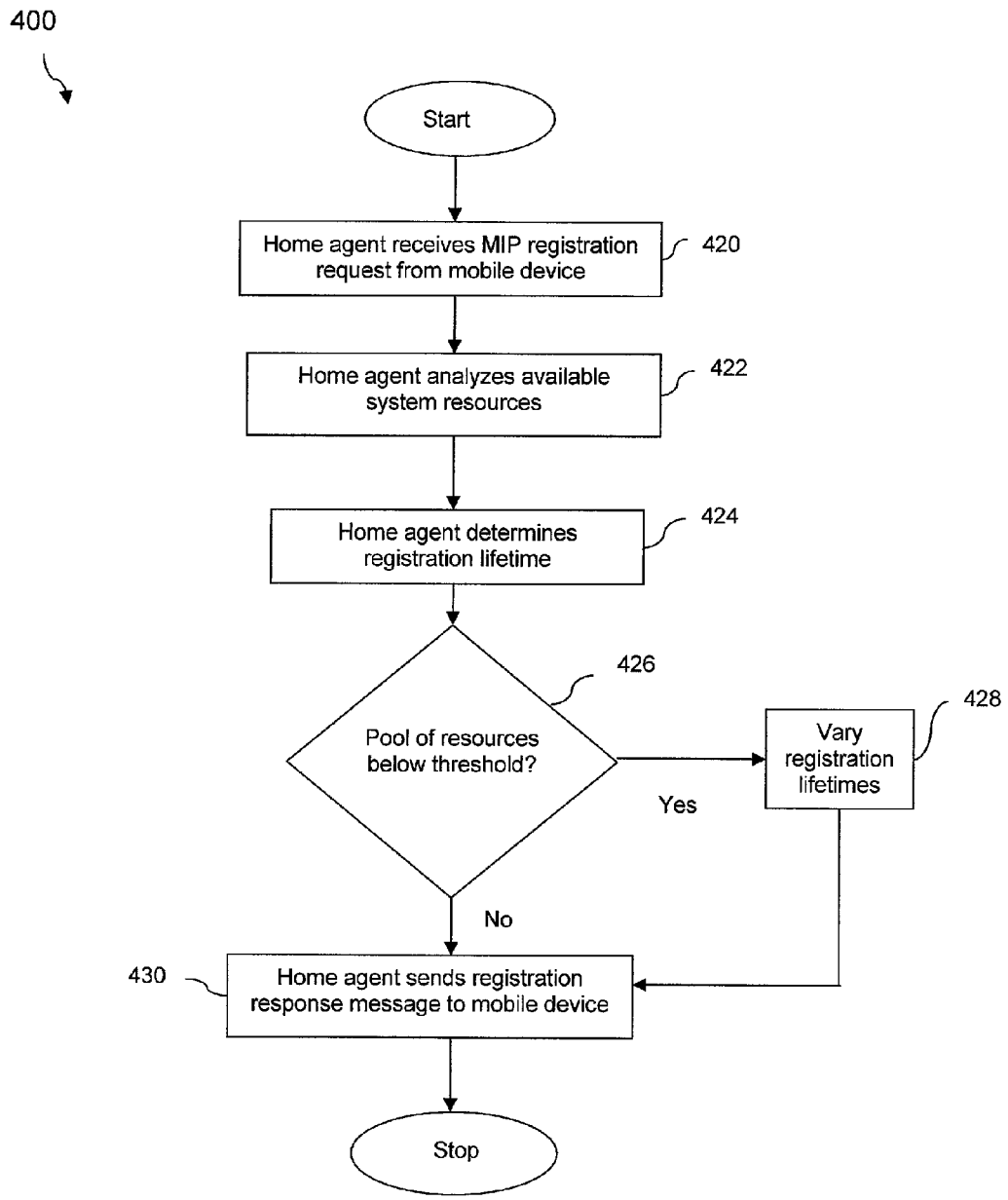
FIG. 4 is a flowchart of another method to manage mobile Internet Protocol registration according to an embodiment of the disclosure.

Turning now to FIG. 4, a method 400 for automatically managing MIP registration is described. The method 400 begins at block 420 where the home agent 134 receives a MIP registration request 122 from the mobile device 102 to obtain access to an Internet data session for a period of time. In block 422, the home agent 134 may analyze available operating resources (e.g., the IP addresses 140, the memory 136 and the processor 138) of the wireless service provider 130. In block 424, the home agent 134 determines the length of the registration lifetime to assign to the mobile device 102.

At block 426, in an embodiment, when the pool of available IP addresses 140 drops below a predefined nominal threshold, the processing proceeds to block 428 where the registration lifetime may be reduced from the standard time to a time based on how many available IP addresses 140 are remaining. For example, if the threshold is set at twenty percent, and less than twenty percent of IP addresses 140 are available, the registration lifetimes for future MIP registration requests 122 may be reduced in proportion to the amount of the remaining IP addresses 140. Alternatively, the lifetime of registration sessions may be determined according to the available capacity of the memory 136 in the computer 132 or the processing load of the home agent 134. In an embodiment, the adjustment of registration lifetimes may balance the relative stress or load on the system 100 related to the available IP addresses versus processing load on the home agent 134.

In another embodiment, to prevent overloading the computer system 132 by constantly re-calculating registration lifetimes, the home agent 134 may wait until after a predetermined number N of MIP registration requests 122 are received before recalculating the registration times. For example, if the number N corresponds to the number 100, then after every 100 MIP registration requests 122, the home agent 134 may re-calculate the registration lifetimes. Alternatively, to prevent overloading the capacity of the computer system 132, the home agent 134 may periodically determine registration times (e.g., every 50 mS) to assign to the mobile devices 102.

Once the lifetime of the registration is determined, the method 400 moves to block 430 where the home agent 134 sends the MIP registration response 124 to the mobile device 102. In an embodiment, the MIP registration response 124 would include the duration of the registration lifetime which may be between approximately 10 and 120 minutes. The home agent 134 would then keep the data session open for the mobile device 102 for the length of the registration lifetime.

Figure 5:
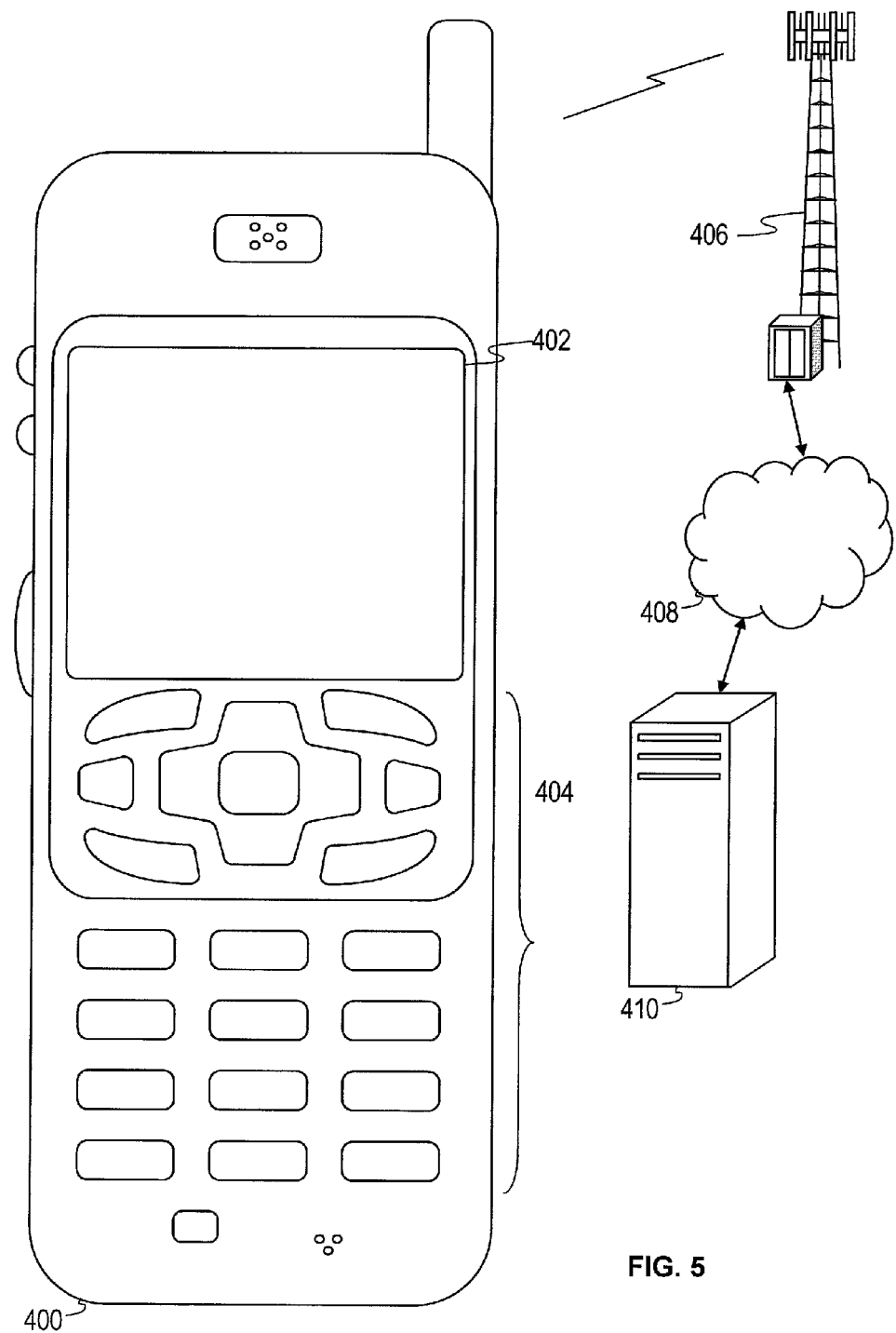
FIG. 5 illustrates a handset suitable for implementing an embodiment of the disclosure.

FIG. 5 shows a wireless communications system including the mobile device 400 which may be similar to the mobile device 102 in FIG. 1. FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 may be a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single BTS 406 is illustrated, it is understood that the wireless communication system may comprise additional base transceiver stations. In some instances, the mobile device 400 may be in communication with multiple BTS 406 at the same time. The BTS 406 (or wireless network access node) is coupled to a wired network 408, such as the Internet. Via the wireless link and the wired network, the mobile device 400 has access to information on various servers, such as a server 410. The server 410 may provide content that may be shown on the display 402. Alternately, the mobile device 400 may access the BTS 406 through a peer mobile device 400 acting as an intermediary, in a relay type or hop type of connection.

Figure 6:
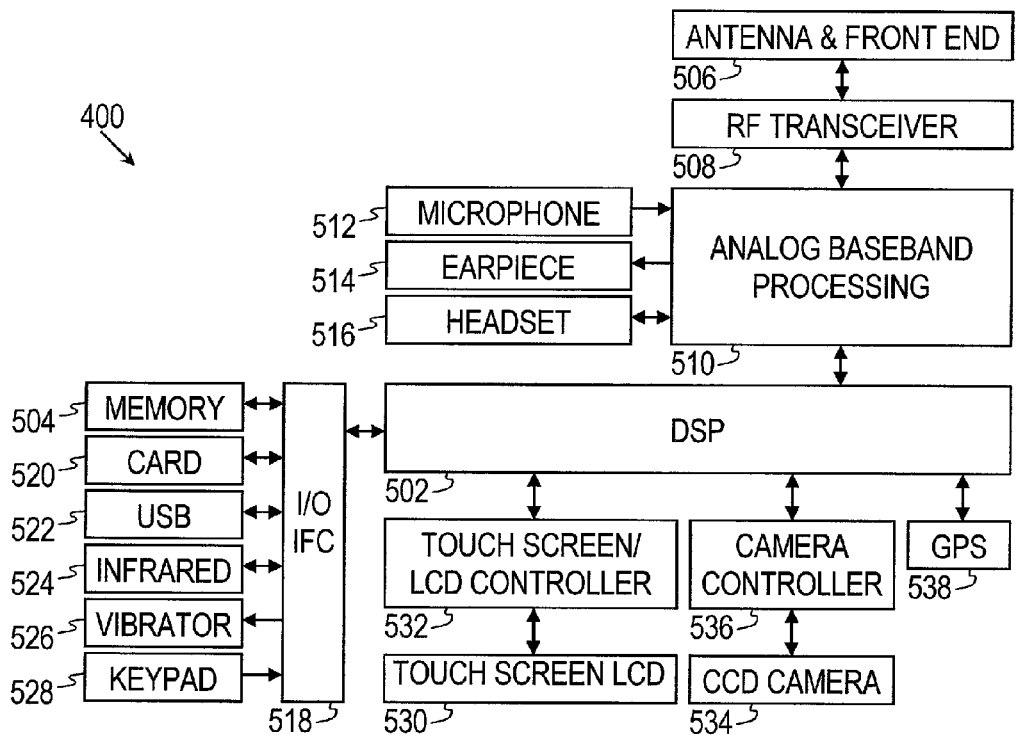
FIG. 6 is a block diagram of a handset suitable for implementing an embodiment of the disclosure.

FIG. 6 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RE power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide Internet connectivity to enable a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 7:
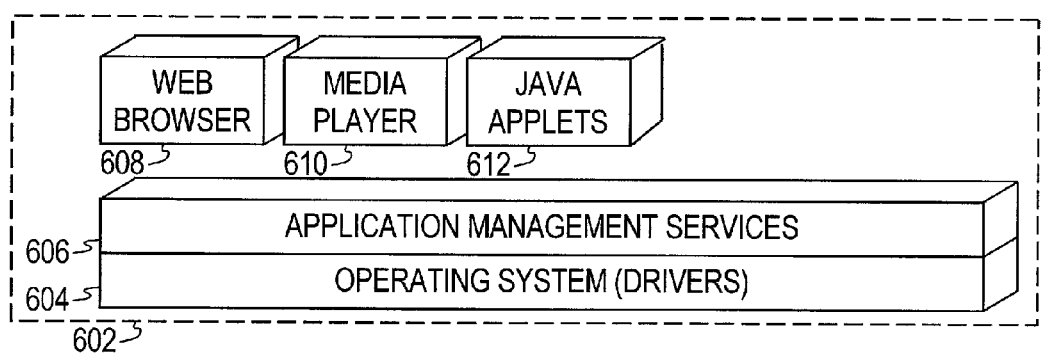
FIG. 7 is a block diagram of a software architecture of a handset suitable for implementing an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 7 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 8:
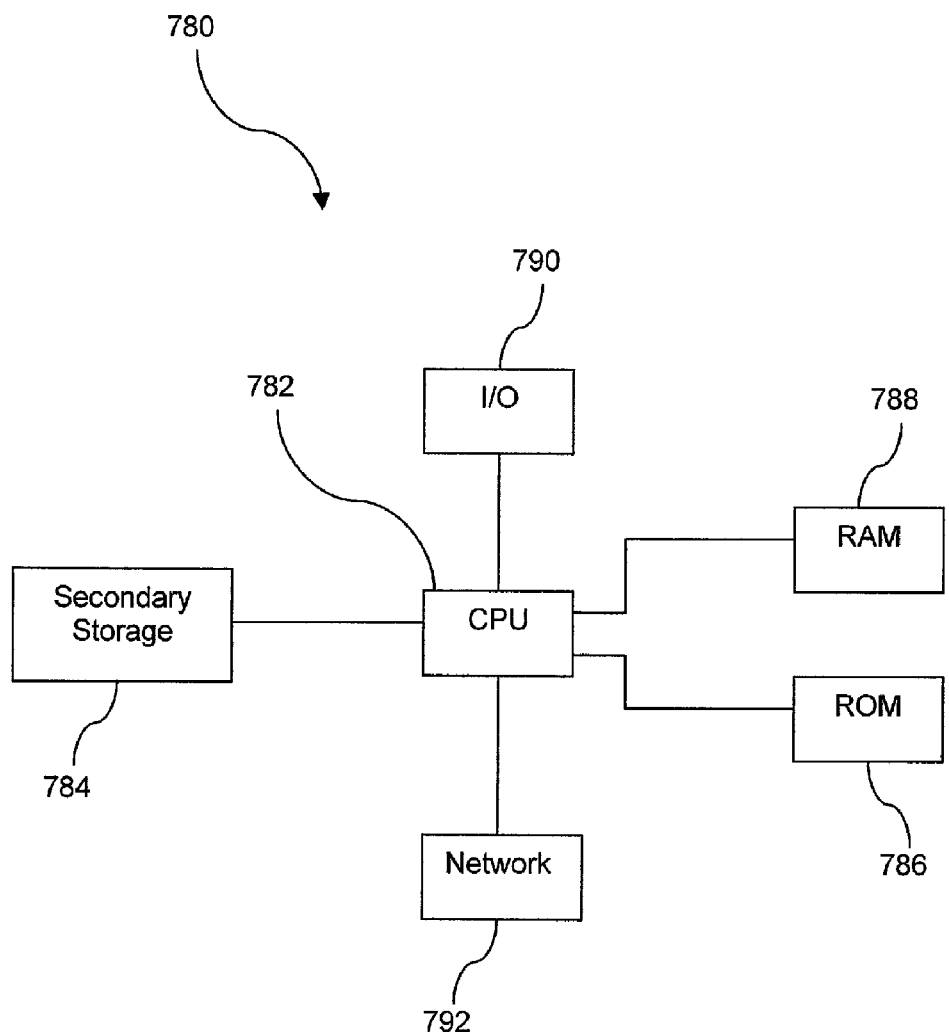
FIG. 8 illustrates an exemplary computer system suitable for implementing some aspects of the several embodiments of the disclosure.

Some aspects of the system described above may be implemented on a computer with sufficient processing power, memory resources, and network throughput capability to handle the necessary workload placed upon it. FIG. 8 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automatically managing mobile Internet Protocol re-registration, comprising:
    a home agent receiving a mobile Internet Protocol registration message;
    in response to the mobile Internet Protocol registration message, the home agent determining a dynamically defined registration lifetime based on changing mobile Internet Protocol network operating conditions, wherein the mobile Internet Protocol network operating conditions comprise currently available system operating resources and a current load of mobile Internet Protocol registration messages, wherein the currently available system operating resources comprise at least one of Internet Protocol addresses, memory capacity of a computer, and processor capacity of the computer, wherein when the current load is above a predefined threshold, the registration lifetime is selected in a round-robin fashion from a predefined number M of calculated registration lifetimes, wherein the calculated registration lifetimes are determined based on how much the current load is above the predefined threshold, and wherein the home agent executes on the computer; and
    the home agent transmitting a registration response message comprising the registration lifetime.

2. The method of claim 1, wherein the Internet Protocol registration message is transmitted by one of a mobile phone, a personal digital assistant (PDA), a media player, a laptop computer, and a tablet computer.

3. The method of claim 1, wherein the registration lifetime is determined to be in the range from about 10 minutes to about 120 minutes.

4. The method of claim 1, wherein the home agent keeps a data session open at least for the length of time of the registration lifetime.

5. The method of claim 1, wherein the current load is determined by the home agent at least in part as a sliding window average of numbers of registration messages received per unit time.

6. The method of claim 1, wherein determining the registration lifetime is further based on a history of mobile Internet Protocol registration messages over a predefined length of time.

7. The method of claim 1, wherein when the current load is above a predefined threshold, the registration lifetime varies from a predefined nominal registration lifetime by an amount based on the how much the current load is above the predefined threshold.

8. A method of automatically managing mobile Internet Protocol re-registration, comprising:
    a home agent receiving a mobile Internet Protocol registration message;
    in response to the mobile Internet Protocol registration message, the home agent determining a dynamically defined registration lifetime based on at least a current load of mobile Internet Protocol registration messages, wherein the current load is determined by the home agent at least in part as a rate of change of numbers of registration messages received per unit time, wherein when the current load is above a predefined threshold, the registration lifetime varies from a predefined average registration lifetime by an amount based on how much the current load is above the predefined threshold, and wherein the registration lifetime varies from the predefined average registration lifetime in a negative sense when the rate of change is positive and the registration lifetime varies from the predefined average registration lifetime in a positive sense when the rate of change is negative; and the home agent transmitting a registration response message comprising the registration lifetime.

9. A method for automatically managing mobile Internet Protocol re-registration, comprising:

a home agent receiving a mobile Internet Protocol registration message;

in response to the mobile Internet Protocol registration message, the home agent determining a dynamically defined registration lifetime based at least on currently available system operating resources and a current load of mobile Internet Protocol registration messages, wherein the currently available system operating resources comprise at least one of Internet Protocol addresses, memory capacity of a computer, and processor capacity of the computer, wherein when the current load is above a predefined threshold, the registration lifetime is selected in a round-robin fashion from a predefined number M of calculated registration lifetimes, wherein the calculated registration lifetimes are determined based on how much the current load is above the predefined threshold, and wherein the home agent executes on the computer; and the home agent transmitting a registration response message comprising the registration lifetime.

10. The method of claim 9, wherein when a pool of available Internet Protocol addresses drops below a threshold, the registration lifetime is reduced from a predefined nominal registration lifetime by an amount based on how much the pool of available Internet Protocol addresses is below the threshold.

11. The method of claim 9, wherein when a pool of available memory capacity of the computer drops below a threshold, the registration lifetime is reduced from a predefined nominal registration lifetime by an amount based on how much the pool of available memory capacity is below the threshold.

12. The method of claim 9, wherein the home agent determines the registration lifetime periodically after a predetermined amount of time.

13. The method of claim 9, wherein the home agent determines the registration lifetime after every predetermined number N of received registration messages, and wherein the predetermined number N of received registration messages is greater than one.

14. The method of claim 10, wherein the Internet Protocol addresses are Internet Protocol version 4 (IPv4) addresses.

* * * * *